(No Model.)
M. B. EARNEST.
NUT LOCK.
No. 461,605. Patented Oct. 20, 1891.
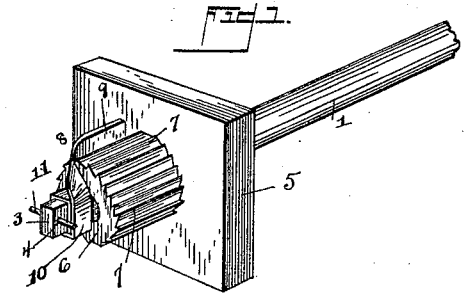
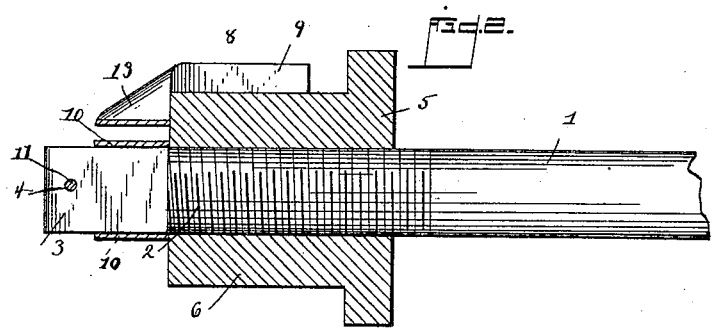
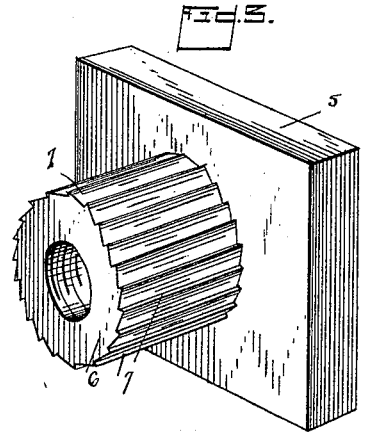 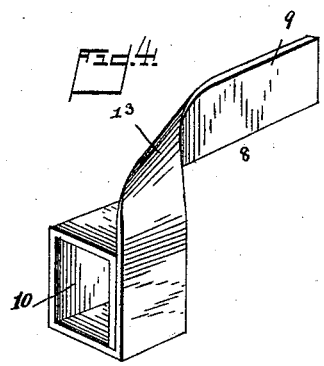
Witnesses
Chas A. Ford.
W. S. Duvall.
Inventor
M. B. Earnest.
By his Attorneys,
C. A. Snow & Co.

UNITED STATES PATENT OFFICE.

MARCUS B. EARNEST, OF FORT MADISON, IOWA.

NUT-LOCK.

SPECIFICATION forming part of Letters Patent No. 461,605, dated October 20, 1891.

Application filed June 6, 1891. Serial No. 395,312. (No model.)

*To all whom it may concern:*

Be it known that I, MARCUS B. EARNEST, a citizen of the United States, residing at Fort Madison, in the county of Lee and State of Iowa, have invented a new and useful Nut-Lock, of which the following is a specification.

This invention relates to improvements in nut-locks, the objects in view being to provide a cheap and efficient device for locking the nuts upon bolts.

Other objects and advantages of the invention will appear in the following description, and the novel features thereof will be particularly pointed out in the claim.

Referring to the drawings, Figure 1 is a perspective of a bolt having a nut-lock constructed in accordance with my invention. Fig. 2 is a vertical longitudinal section of a portion of the bolt and nut. Fig. 3 is a detail of the nut. Fig. 4 is a similar view of the spring-locking pawl.

Like numerals of reference indicate like parts in all the figures of the drawings.

1 designates a bolt, having a threaded portion 2 and at its extremity squared, as at 3, and provided with a transverse perforation 4.

5 designates the rectangular body portion of the nut, which body portion is adapted to receive the jaws of a wrench, whereby the nut may be rotated upon the bolt, for which purpose said nut is bored and interiorly threaded, as is usual. From the front face or crown of the nut there extends forwardly a cylindrical threaded hub 6, the threads of which form a continuation of those of the body of the nut, and the exterior of the hub is provided with a series of longitudinally-disposed ratchet-teeth 7.

8 designates a spring-pawl, said pawl consisting of the tooth-engaging end 9 and the bolt-receiving eye 10, the latter located at the outer end of the pawl and being rectangular to receive the correspondingly-shaped outer end of the bolt, said pawl being held in position by means of a pin or key 11, passed through the perforation in the end of the bolt. Between its eye and engaging end the pawl is twisted, as at 13, so as to bring the longitudinal edge of the pawl parallel with the bolt and adapted to engage the teeth of the hub and resist movement of the hub or nut in one direction while permitting of the same in the opposite direction. The pawl is formed from a strip of spring sheet steel, said strip being bent, as shown, to form the eye, and subsequently twisted to form the engaging end.

In operation the nut is threaded on the bolt and tightened by means of a wrench, after which the pawl is placed in position, as heretofore described, so that its inner end engages the teeth of the hub and said pawl is locked in position by means of the locking-pin 11, whereby it is prevented from slipping from the bolt. It will be obvious that the pawl is so disposed as to permit of the bolt being retightened if at any time it should require it, said pawl slipping over the teeth of the hub, and also that by reason of its disposition and those of the teeth it will resist any retrograde movement upon the part of the nut.

It will be seen that the invention while reliable and extremely efficient is very simple and may be produced at a small cost and easily assembled.

Having described my invention, what I claim is—

The combination, with the bolt having the threaded portion and terminating in the squared end, of the nut threaded on the bolt and having the rectangular body portion and cylindrical crown or hub, the latter provided with longitudinally-disposed inclined ratchet-teeth, the flat spring-pawl engaging the teeth and twisted and bent to form the eye for engaging the square end of the bolt, and means for retaining the pawl on the bolt, substantially as specified.

In testimony that I claim the foregoing as my own I have hereto affixed my signature in presence of two witnesses.

MARCUS B. EARNEST.

Witnesses:
WM. FIELD,
W. F. TRAVERSE, Jr.